United States Patent [19]

Kettemann et al.

[11] Patent Number: 5,716,996
[45] Date of Patent: Feb. 10, 1998

[54] METHOD FOR THE RECOVERY OF SECONDARY POLYOLS FROM PAINT SLUDGES

[75] Inventors: Bernd-Uwe Kettemann, Elchingen; Michele Melchiorre, Blaustein, both of Germany

[73] Assignee: Mercedes-Benz AG, Stuttgart, Germany

[21] Appl. No.: 747,700

[22] Filed: Nov. 12, 1996

[30] Foreign Application Priority Data

Nov. 9, 1995 [DE] Germany .................. 195 41 780.1

[51] Int. Cl.$^6$ ................................................ C08G 18/14
[52] U.S. Cl. .................... 521/44; 521/45; 521/49; 521/49.5
[58] Field of Search ..................... 521/44, 45, 49, 521/49.5

[56] References Cited

U.S. PATENT DOCUMENTS

| | | |
|---|---|---|
| 4,511,680 | 4/1985 | Niederdellmann et al. ......... 521/49.5 |
| 5,252,615 | 10/1993 | Rao et al. . |
| 5,281,629 | 1/1994 | Hovestadt et al. . |
| 5,453,460 | 9/1995 | Hovestadt et al. . |

FOREIGN PATENT DOCUMENTS

| | | |
|---|---|---|
| 0 556 670 | 8/1993 | European Pat. Off. . |
| 0 610 719 | 8/1994 | European Pat. Off. . |
| 0 613 922 | 9/1994 | European Pat. Off. . |
| 29 35 103 | 3/1981 | Germany . |
| 32 32 461 | 3/1984 | Germany . |
| 43 20 566 | 1/1995 | Germany . |
| 43 28 157 | 1/1995 | Germany . |
| 44 33 834 | 10/1995 | Germany . |

OTHER PUBLICATIONS

Alkoholyse—chemisches Recyclingverfahren für PUR und gemischte Kunstrstoffbfälle, Kunstoffe 81 (1991) 4, pp. 301–305.

*Primary Examiner*—John M. Cooney, Jr.
*Attorney, Agent, or Firm*—Evenson, McKeown, Edwards & Lenahan, P.L.L.C.

[57] ABSTRACT

The invention relates to a method for the recovery of secondary polyols from paint sludge coagulate, formed from paint overspray which has first been dewatered by mass action, by chemical treatment in a manner such that the recovered product can be reused in the manufacture of paints. According to the recovery method, the organic components contained in the paint coagulate are glycolytically split at an elevated temperature into reusable polyols. Preferably, a mixture of different glycols is used, preferably in an amount of about 20 to 50% by weight based on the dewatered paint coagulate. The addition of glycol dilutes the paint coagulate and makes it flowable. The water contained in the paint coagulate is evaporated and removed during the glycolytic splitting because of the increase in temperature. The impurities contained in the paint coagulate, such as pigments, coagulants or flocculants, can be comminuted and finely dispersed by intensive shearing of the paint coagulate. At the end of the process, these impurities can also be filtered out from the polyols formed.

13 Claims, No Drawings

METHOD FOR THE RECOVERY OF SECONDARY POLYOLS FROM PAINT SLUDGES

SUMMARY OF THE INVENTION

The present invention relates to a method for the recovery of secondary polyols from paint sludges formed from paint overspray collected during spray painting to which a coagulant has been added, as disclosed, for example, in U.S. Pat. No. 5,281,629 (counterpart of EP 556 670).

When paints are applied by spraying, a significant portion of paint, about 30 to 50% of the amount used, is unavoidably sprayed past the substrate that is to be painted. This so-called overspray is collected on the walls of the painting booth, down which it drains to be collected. Usually, the overspray is collected by a film of water which runs down the walls of the booth to be discharged. The collected paint particles are then coagulated by the addition of a coagulant, usually clay or a similar substance, and in some cases, a flocculant is also added, so that a paint sludge is formed from the collected paint particles. This method of collecting overspray can be used for all types of paint, namely for water-based paints such as acrylate paints, solvent paints, one-component paints and two-component paints such as polyurethane paints. Epoxide paints may also be mentioned as an example of such two-component paints.

After dewatering and, in some cases, drying, the paint sludge is usually disposed of as hazardous waste. This method incurs very high disposal costs. As a result, attempts have been made to find ways of using the paint sludge, in order to not only avoid disposal of the paint sludge and the high costs associated therewith, but also, in addition, to be able to recycle any materials of value contained in the paint sludge, as a raw material.

Published German Patent Application DE 43 28 157 discloses a method of dewatering and drying paint sludge, which is then introduced in granulate form as a source of carbon and slag-forming agent with blast air into a blast furnace. Published German Patent Application DE 29 35 103 discloses an attempt to produce a composition which can be processed into articles by injection molding, by mixing reinforcing fibers with well dewatered paint sludge. According to Published German Patent Application DE 43 20 566, paints can also be concentrated in the discharged water by electrophoresis, wherein the paint adheres to an anode roller or belt and is scraped off and separated in a concentrated form from the water discharged from the spray booth. It is also possible to concentrate the paint particles in the water discharged from the spray booth by membrane ultrafiltration.

The resin or paint vehicle is also commonly extracted from paint sludge by mixing the paint sludge, which has largely been dewatered, with a solvent and subsequently diluting the mixture so that the resulting liquid can be filtered. As a result, the soluble vehicle can be separated from the coagulant in the coagulated paint. The recovered vehicle can then be formulated into new paints.

The recovery of paint from paint sludge is, however, only possible for one-components paints, in which the resin or the paint vehicle remains reactive for a relatively long time at room temperature and in a moist environment. When two-component systems are involved, these methods are not possible, because the two components react with one another during the time when the paint is collected and dewatered, causing the resin to set, so that it can no longer be used as a reactive raw material. Therefore, aside from the expense of disposal as hazardous waste, paint sludges of two-component paints could generally in the best case scenario be hydrogenated, incinerated or disposed of in a blast furnace, in which the actual value of the material, which is obtained in relatively large amounts, is largely wasted.

U.S. Pat. No. 5,281,629 (counterpart of EP 556 670) discloses a method for recovering the paint vehicle from paint coagulates of a two-component paint based on polyurethanes. According to this method, the cross-linking reaction between the vehicle component, namely the polyol, and the curing agent component, namely the polyisocyanate, is prevented by the addition of a blocking agent such as an amine. That is, the reactivity of the reactive end groups of the curing agent is blocked, so that the blocked polyisocyanate can no longer react with the polyol component at room temperature. This method proceeds according to the following steps:

discharging the coagulate from the booth water, preliminarily dewatering the paint sludge by centrifuging, decanting, etc.

blocking the ability of the end groups of the curing agent to react and diluting the mixture with a solvent, separating the insoluble coagulant components, for example, the coagulant, the pigments, etc. by filtration, removing the residual water from the filtrate, which contains the resin components and the blocked curing agent component and adjusting the rheological properties of the recyclate to the desired values when reformulating a paint.

Unfortunately, practical experience has shown that this method functions only for very small paint booths with short residence times of one or at most two hours of paint overspray or paint coagulate for the first two steps of the method before the blocking agent is added. The powerful foul smell of the blocking agent and the resulting discomfort during painting makes it is impossible to add the blocking agent much earlier. As a result, the blocking agent may only be added when the paint coagulate reaches a part of the plant which is completely and permanently closed off and/or is appropriately accommodated in an open space or in a separate room from which odors cannot escape into the work areas. In the case of larger industrial-size paint shops, the residence time of the paint coagulate until the conclusion of the preliminary dewatering step is more likely to be days rather than hours. In such paint shops, the two components of the paint sludge of a two-component paint have already completely reacted with one another by the time the preliminary dewatering process has been concluded. The blocking agent, which can only be added after the preliminary dewatering is concluded, cannot reverse the completed reaction. For this reason, this recovery method is not applicable to larger paint shops. A further disadvantage of this method is that as the blocked curing agent is contained in the recycled material, at higher temperatures, for example, when the recycled paint is heated, the blocking action disappears and the curing action comes into play once again. This must be taken into consideration when reformulating the recycled paint, whether it is a one-component or a two-component paint. This makes it practically impossible to introduce the recycled material into a manufacturing process for primary paints during the production of paints.

It is an object of the present invention to provide a method, which can be used universally for the recovery of paint from paint sludges of one-component and two-component paints in small as well as in large paint shops, in a manner such that the recycled material can also be used to produce primary paints of any kind.

Pursuant to the present invention, these and other objects are accomplished by a method for the recovery of the paint vehicle from a paint sludge coagulate of paints, which paint coagulate is formed from overspray collected during the application of the paint by spraying by the addition of a coagulant, wherein the paint coagulate, which has first been dewatered, is chemically treated and a vehicle product, which can be used for the production of paint, is produced, comprising heating the paint coagulate to a temperature above 100° C. and glycolytically hydrolyzing or splitting its organic components into polyols, which can be reused as a vehicle for the production of paints, wherein the water, contained in the paint coagulate, is evaporated and removed during the glycolytic splitting.

According to these features, the organic components of the paint coagulate are glycolytically split at an elevated temperature into reusable polyols, from which the vehicle resins of a new paint can be produced. This recovery of polyols is possible with sludges from all types of paints and the recovered polyols can be further processed into any possible type of new paint.

For the glycolysis, a mixture of glycols is preferably used and, moreover, in an amount which dilutes the paint coagulate, preferably about 20 to 50% by weight of the paint coagulate. The water contained in the paint coagulate is evaporated during the glycolytic splitting because of the increase in temperature and discharged. The other materials contained in the paint coagulate, such as pigments, coagulants or flocculants, can be comminuted and finely dispersed by intensive shearing of the flowable, diluted paint coagulate during the glycolytic splitting. Alternatively, these components can be filtered out of the polyols formed at the end of the process.

In order to supply the heat required for the glycolysis of the paint sludge, the temperature of the paint coagulant is raised by an externally supplied source as well as by internal friction resulting from the intensive shearing in a shearing reactor. If necessary, impurities in the paint sludge, such as pigments, coagulants or flocculants can be comminuted and dispersed by the shearing, so that they no longer interfere in the subsequent raw paint material. The temperature of the mass during glycolytic splitting is 150° to 250° C., and preferably to 200° C. Preferably, a mixture of glycols is used for the glycolysis of the paint sludges which is composed:

diethylene glycol (DEG)

dipropylene glycol (DPG) and butylene glycol (BG), preferably 1,3-butylene glycol.

The amount of glycol mixture added corresponds to 10 to 100% by weight of the paint to be converted. Glycolytic splitting can be carried out as a batch operation or as a continuous operation. Preferably, the glycolysis is carried out in a batch reactor. The reactor is usually equipped with a stirrer, a distillation unit, an inlet for the paint sludge and an inlet for the glycol. Furthermore, it is possible to integrate a shearing reactor into the course of the process.

A secondary polyol obtained from polyurethane paint sludges has the following analytical data after the glycolysis:

OH number: 324 acid number: 4.3 viscosity (20° C.): 2,500 mPas.

Generally, the OH number, that is, the number of polyol reactive end groups, determines the hardness of the cured paint and, for conventional paint polyols, ranges from 150 to 400. The acid number indicates the number of free carboxylic acid groups and should be as low as possible. For paint polyols, the dynamic viscosity is usually between 1,000 and 10,000 mPas. If the viscosity of the paint during processing deviates from the desired value, it is adjusted by the addition of solvents. Preferably, the amount of solvent used should be as low as possible. The secondary polyols recovered pursuant to the present invention, can be converted into a raw material for paints by admixing with processing additives as well as by blending with a primary polyol.

Contamination of the waste product with coagulants and/or flocculants does not interfere with the glycolytic splitting of the paint sludge according to the present invention. The impurities either are finely dispersed by intensive shearing during the glycolysis, so that they no longer interfere during later processing of the paint, or they are removed by a solid/liquid separation, for example by filtration, after glycolysis, if the secondary polyols are to be processed further to a light colored paint or to a clear lacquer. If they are to be processed further into a black paint for painting axles or engine parts for example, or to a paint of dark color, such as a filler paint, the impurities can remain in the polyols. In this case, it is advantageous to finely disperse the impurities in order to ensure trouble-free processing of the recycled paint in plants with fine valves, metering pumps and spraying equipment.

A shearing reactor, suitable for comminuting and finely dispersing inorganic components, such as pigments, coagulants or flocculants, could be formed, for example, by a disk rotor with a plurality of aligned, axially perpendicular perforated, circular disks spaced a predetermined distance from each other and by a stator, which is provided with perforated stator disks, which are inserted between the rotor disks with little axial clearance (for example, about 0.1 to 0.5 mm) between the rotor and stator disks. The paint coagulate is passed at a low flow rate essentially axially through the shear reactor, with the rotor rotating at rates of 5,000 to 20,000 rpm. This leads to average peripheral speeds of 30 to 100 m/sec, depending on the rpm and the diameter. Because of the internal friction generated in the paint sludge, not only are the particles comminuted and finely dispersed, but the paint is also heated by at least 30° C.

The paint sludge usually has a relatively high residual moisture content (for example, about 50% by weight). However, this water should not be contained in the newly formulated paint and thus, also not in the recovered polyols. Water-containing mixtures can also be processed in accordance with the recovery method of the present invention in such a manner that the recovered polyol is largely anhydrous, even without adding a special dewatering step. According to the present invention, the water is automatically distilled off during glycolysis, which takes place at elevated temperatures.

Other objects, advantages and novel features of the present invention will become apparent from the following detailed description of the preferred embodiments of the invention.

DETAILED DESCRIPTION OF PREFERRED EMBODIMENTS

Example 1

The paint sludge concentrate used for Example 1, originates from the painting of aircraft parts. The waste is obtained as floating sludge after the coating process. The paint concentrate is composed of the following:

polyurethane: 71.4% by weight water: 20.5% by weight solvent: 2.5% by weight epoxide: 5.6% by weight.

This concentrate of reacted polyurethane paint is transferred to a stirred reactor to which a glycol mixture, which consists of diethylene glycol and 1,3-butylene glycol, has been added, and is heated with constant stirring to a mass temperature of 195° C. During the process, care is taken to ensure that the temperature in the reactor does not drop below 190° C. During glycolytic splitting, the volatile residual moisture of the paint sludge is automatically distilled off and a pre-glycolysate is obtained. The ratio to which the paint sludge is mixed with glycol mixture depends on the desired end product of the recovery method, which can be a raw paint material either for a filler paint or, for example, for a structural paint. For the secondary polyol produced in this example, the paint sludge and the glycol were mixed in a ratio of 80% to 20% by weight. Subsequently, in a separation step, the pre-glycolysate is separated from the nonvolatile components (epoxides) by a liquid-solid separation (filtration). After the glycolysis reaction is complete and the impurities have been removed, the secondary polyols obtained from the paint sludge, have the following analytical data:

OH number: 237 acid number: 3.4 viscosity (20° C.): 908 mPas

After admixture with processing additives, the secondary polyols can be reacted alone or after being blended with a primary polyol.

Example 2

The paint sludge concentrate used in Example 2, originates from painting automobiles. The waste is obtained as a sludge coagulate from the processing of a two-component clear lacquer based on polyurethane. The paint concentrate has the following composition:

paint coagulate: 41.9% by weight water: 55.0% by weight coagulant: 3.1% by weight The procedure and corresponding process parameters for glycolytic splitting of the polyurethane and the processing of the paint sludge is identical to the procedure and parameters mentioned in Example 1. After the glycolysis reaction is completed and the impurities are removed, the secondary polyol obtained from the paint sludge has the following analytical data:

OH number: 324 acid number: 4.3 viscosity (20° C.): 2,500 mPas

After being mixed with processing additives, these secondary polyols can also be reacted alone or blended with a primary polyol.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for recovering secondary polyols from paint sludge coagulate formed from paint overspray collected during spray painting to which a coagulant has been added and which has been dewatered, said method comprising heating the paint coagulate to a temperature above 100° C., and glycolytically splitting organic components of the paint coagulate into polyols, which can be reused as a vehicle for the production of paints, while simultaneously evaporating and removing residual water contained in the paint coagulate.

2. The method of claim 1, further comprising diluting the paint coagulate to make it flowable and subsequently comminuting and dispersing impurities contained in the paint coagulate by shearing the paint coagulate between closely adjacent surfaces moving relative to one another.

3. The method of claim 2, wherein the impurities are pigments, coagulants or flocculants.

4. The method of claim 1, wherein the glycolytic splitting takes place at a temperature in the range of from 150° C to 250° C.

5. The method of claim 4, wherein the temperature is in the range of from 190° C. to 200° C.

6. The method of claim 1, wherein the glycolytic splitting is effected with a mixture of different glycols.

7. The method of claim 6, wherein the glycol mixture contains at least two of the following glycols:

diethylene glycol (DEG)

dipropylene glycol (DPG) and butylene glycol (BG).

8. The method of claim 7, wherein the butylene glycol is 1,3-butylene glycol.

9. The method of claim 1, wherein the glycolytic splitting is effected by adding glycols in an amount of from 10 to 100% by weight based on the weight of the dewatered paint coagulate.

10. The method of claim 9, wherein the glycols are added in an amount of 20 to 50% by weight.

11. The method of claim 2, comprising shearing the paint coagulate during comminuting and dispersing at a relative velocity of the surfaces of about 30 to 100 m/sec.

12. The method of claim 1, further comprising filtering out impurities from the polyols formed by the glycolytic splitting.

13. The method of claim 12, wherein the impurities are pigments, coagulants or flocculants.

* * * * *